United States Patent
Dienst et al.

(10) Patent No.: US 10,813,279 B2
(45) Date of Patent: Oct. 27, 2020

(54) TANK SUPPORT ASSEMBLY FOR AN AGRICULTURAL IMPLEMENT

(71) Applicant: CNH Industrial Canada, Ltd., Saskatoon (CA)

(72) Inventors: Johnathon R. Dienst, Maple Park, IL (US); Gerard James Gadzella, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 244 days.

(21) Appl. No.: 15/909,726

(22) Filed: Mar. 1, 2018

(65) Prior Publication Data

US 2019/0269066 A1 Sep. 5, 2019

(51) Int. Cl.
| | | |
|---|---|---|
| *A01C 15/00* | (2006.01) | |
| *B60R 3/00* | (2006.01) | |
| *A01C 7/20* | (2006.01) | |
| *A01C 7/08* | (2006.01) | |

(52) U.S. Cl.
CPC ............ *A01C 15/006* (2013.01); *A01C 7/208* (2013.01); *B60R 3/00* (2013.01); *A01C 7/08* (2013.01)

(58) Field of Classification Search
CPC ......... A01C 15/006; A01C 7/208; A01C 7/08; B60R 3/00
See application file for complete search history.

(56) References Cited

U.S. PATENT DOCUMENTS 2,912,944 A * 11/1959 Snow .................. A01C 23/025
111/121
3,295,482 A * 1/1967 Dountas .............. A01C 23/008
111/120

(Continued)

OTHER PUBLICATIONS

Monosem, 7.CSS-Complete, 37 pages, Jun. 16, 2013, Internet Archive Wayback Machine.†

(Continued)

*Primary Examiner* — Jamie L McGowan
(74) *Attorney, Agent, or Firm* — Rebecca L. Henkel; Rickard K. DeMille (57) ABSTRACT

A tank support assembly for an agricultural implement includes a primary connecting member and first, second, and third support members. The primary connecting member is configured to couple to a main frame assembly of the agricultural implement, where the primary connecting member extends substantially along a longitudinal axis of the agricultural implement. The first support member is configured to couple to the primary connecting member at an end of the first support member. The second and third support members are configured to couple to the first support member, the primary connecting member, or a combination thereof, at ends of the second and third support members. The first support member extends substantially vertically upward from the primary connecting member and the second and third support members extend generally upward and generally outward from the primary connecting member. The first, second, and third support members are configured to transfer a portion of a weight of a tank to the primary connecting member.

7 Claims, 6 Drawing Sheets

(56) References Cited

U.S. PATENT DOCUMENTS

| | | | | |
|---|---|---|---|---|
| 3,588,139 A * | 6/1971 | Bayne | A01B 63/32 | 280/43.22 |
| 4,014,271 A * | 3/1977 | Rohlf | A01C 23/021 | 111/123 |
| 4,015,549 A * | 4/1977 | Brown, Jr. | A01M 7/0082 | 111/8 |
| 5,809,914 A * | 9/1998 | Follmer | A01B 51/04 | 111/56 |
| 5,996,704 A * | 12/1999 | Landry | A01B 39/24 | 111/925 |
| 6,935,256 B1 * | 8/2005 | Meyer | A01C 7/081 | 111/174 |
| 7,703,404 B2 * | 4/2010 | Horn | A01C 15/006 | 111/174 |
| 8,434,593 B2 * | 5/2013 | Remoue | A01B 63/22 | 111/57 |
| 8,672,173 B2 * | 3/2014 | Hall | A01C 15/006 | 111/63 |
| 8,893,817 B2 * | 11/2014 | Remoue | A01B 63/22 | 111/57 |
| 2002/0017389 A1 * | 2/2002 | Moser | A01B 63/32 | 172/311 |
| 2009/0000534 A1 * | 1/2009 | Horn | A01C 15/006 | 111/200 |
| 2011/0048298 A1 * | 3/2011 | Leskiw | A01C 15/00 | 111/147 |
| 2013/0025515 A1 * | 1/2013 | Kuebler | A01C 23/008 | 111/118 |
| 2014/0060401 A1 * | 3/2014 | Blunier | A01C 23/008 | 111/118 |
| 2014/0060402 A1 * | 3/2014 | Blunier | A01B 59/048 | 111/118 |
| 2014/0060403 A1 * | 3/2014 | Blunier | A01B 59/048 | 111/118 |
| 2014/0190380 A1 * | 7/2014 | MacDonald | A01C 7/082 | 111/174 |
| 2014/0209000 A1 * | 7/2014 | Henry | A01C 7/042 | 111/174 |
| 2016/0165793 A1 * | 6/2016 | Azenha | A01C 11/025 | 111/105 |

OTHER PUBLICATIONS

Moore-Built, CCCS Bulk Fill Planter Toolbars, 2 pages, Oct. 19, 2016, Internet Achive Wayback Machine.†

\* cited by examiner
† cited by third party

FIG. 6

TANK SUPPORT ASSEMBLY FOR AN AGRICULTURAL IMPLEMENT

BACKGROUND

The present disclosure relates generally to a tank support assembly for an agricultural implement.

Generally, planting implements (e.g., planters) are towed behind a tractor or other work vehicle via a mounting bracket secured to a rigid frame of the implement. Planting implements typically include multiple row units distributed across a width of the implement. The row units are spaced apart from one another and are configured to deposit seeds at a target depth beneath the soil surface of a field, thereby establishing rows of planted seeds spaced apart from one another. The spacing between row units may be adjusted by a manufacturer or dealer for a particular row spacing, and, for certain implements, may be further adjusted by a user.

In certain planting implements, a tank is supported by the frame and is configured to carry seeds dispensed by the row units. However, certain planting implements with tanks include tank supports having multiple members positioned between row units. Consequently, the tank supports may interfere with a manufacturer's or a user's ability to adjust row unit spacing in an area around the tank support. As such, users of planting implements typically employ different planting implements for different row spacings, which results in additional costs to the user.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a tank support assembly for an agricultural implement includes a primary connecting member and first, second, and third support members. The primary connecting member is configured to couple to a main frame assembly of the agricultural implement, where the primary connecting member extends substantially along a longitudinal axis of the agricultural implement. The first support member is configured to couple to the primary connecting member at an end of the first support member. The second and third support members are configured to couple to the first support member, the primary connecting member, or a combination thereof, at ends of the second and third support members. The first support member extends substantially vertically upward from the primary connecting member, and the second and third support members extend generally upward and generally outward from the primary connecting member. The first, second, and third support members are configured to transfer a portion of a weight of a tank to the primary connecting member.

In another embodiment, an agricultural implement includes a main frame assembly having a tool bar and a tank support assembly. The tank support assembly includes a primary connecting member and first, second, and third support members. The primary connecting member is coupled to the tool bar of the main frame assembly, and the primary connecting member extends generally perpendicular to the tool bar. The first support member is configured to couple to the primary connecting member at an end of the first support member. The second and third support members are configured to couple to the first support member, the primary connecting member, or a combination thereof, at ends of the second and third support members. The first support member extends substantially vertically upward from the primary connecting member, and the second and third support members extend generally upward and generally outward from the primary connecting member. The first, second, and third support members are configured to transfer a portion of a weight of a tank to the primary connecting member.

In a further embodiment, a tank support assembly for an agricultural implement includes a primary connecting member, a secondary connecting member, and a support member. The primary connecting member is configured to couple to a tool bar of a main frame assembly of the agricultural implement, where the primary connecting member extends generally perpendicular to the tool bar. The tool bar is configured to support row units. The secondary connecting member is configured to couple to the main frame assembly of the agricultural implement above the row units. The support member is configured to couple to the primary connecting member and to transfer a portion of a weight of a tank to the primary connecting member.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
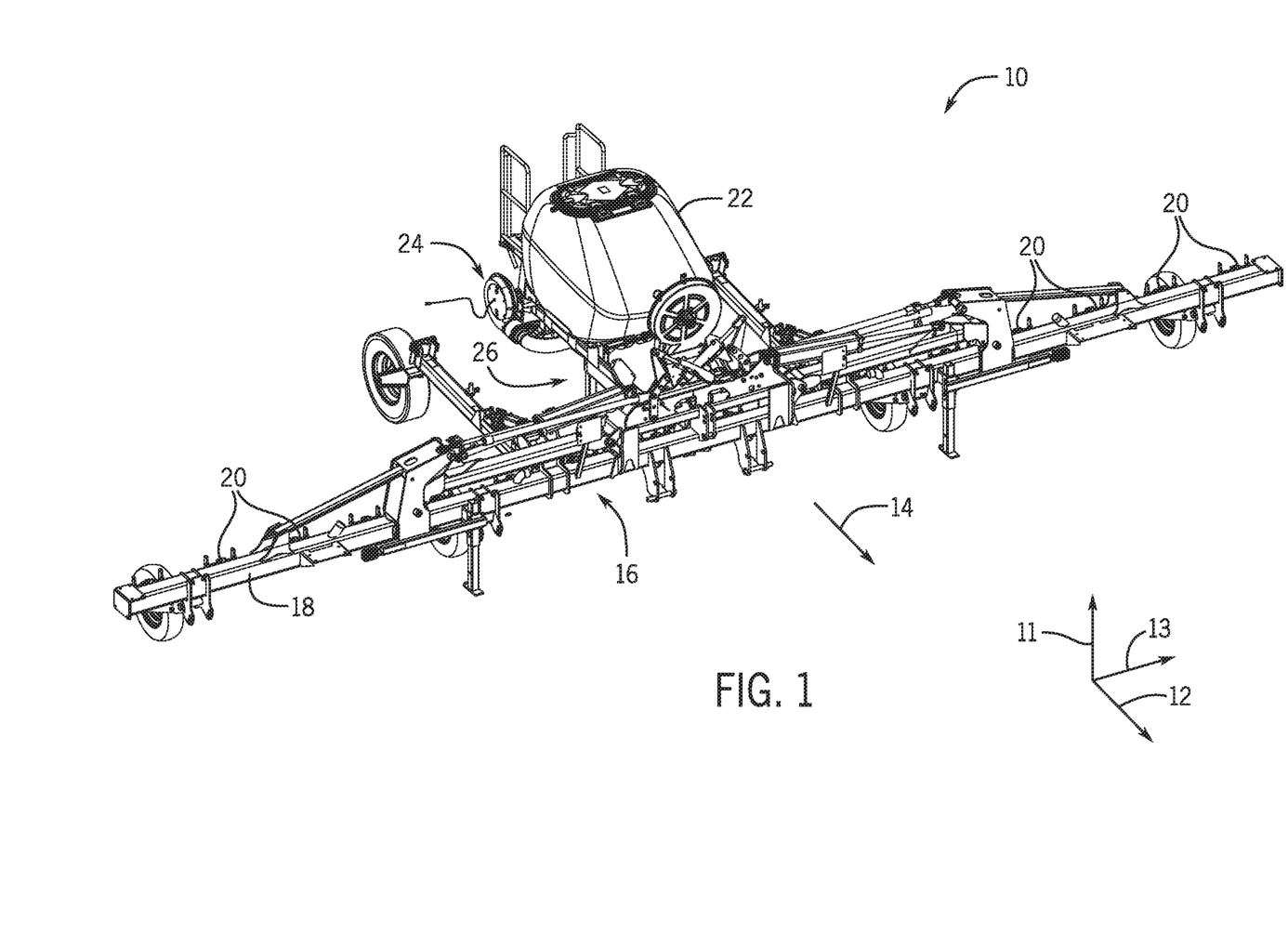
FIGS. 1 and 2 are perspective views of an embodiment of an agricultural implement having a tank support assembly.

FIG. 1 is a perspective view of an embodiment of an agricultural implement 10 having a tank support assembly 26. To facilitate discussion, the implement 10 and certain components of the implement 10 may be described with reference to a vertical axis or direction 11, a longitudinal axis or direction 12, and a lateral axis or direction 13. In the illustrated embodiment, the implement 10 is configured to be towed along a direction of travel 14 (e.g., along longitudinal axis 12) by a work vehicle, such as a tractor. The work vehicle may be coupled to the implement 10 by a hitch assembly. The hitch assembly may be coupled to a main frame assembly 16 of the implement 10 to facilitate towing of the implement 10 in the direction of travel 14. In the illustrated embodiment, the main frame assembly 16 includes a tool bar 18 that extends along lateral axis 13. Row units may be coupled to the tool bar 18 via row unit mounting assemblies 20. Each row unit is configured to deposit particulate material (e.g., seeds) at a target depth beneath the soil surface, thereby establishing rows of planted seeds.

The implement 10 also includes a particulate material tank 22, a pneumatic distribution system 24 configured to convey particulate material from the tank 22 to the row units, and a tank support assembly 26. The tank support assembly 26 is coupled to the main frame assembly 16 and the tank 22. As will be explained in greater detail below, the tank support assembly 26 is configured to support the tank 22 while enabling row units adjacent to the tank support assembly 26 to be adjusted to achieve various row spacings.

In certain embodiments, the pneumatic distribution system 24 includes an inductor box positioned beneath the tank 22. The inductor box is configured to receive particulate material from the tank 22, to fluidize the particulate material into an air-particulate material mixture, and to distribute the air-particulate material mixture to the row units via a network of pneumatic hoses/conduits. For example, the inductor box may include multiple air pathways for directing airflow through the inductor box. The multiple air pathways enable the inductor box to fluidize particulate material, such as seeds. Depending on the desired application, the pneumatic distribution system may distribute a wide variety of seeds (e.g., light seeds, heavy seeds, large seeds, small seeds, etc.).

As noted above, the implement 10 includes row units configured to deposit particulate material in the soil surface. While the illustrated implement 10 includes 16 row unit mounting assemblies 20 configured to support 16 corresponding row units, alternative implements may include more or fewer row unit mounting assemblies 20 and corresponding row units. For example, certain implements 10 may include 6, 8, 12, 16, 24, 32, or 36 row unit mounting assemblies 20 and a corresponding number of row units, or more.

In addition, the spacing between row units may be adjusted by a manufacturer or dealer, and in certain embodiments, may be further adjusted by a user of the implement 10. The row unit spacing is the distance between row units along the tool bar 18, which may be particularly selected based on the desired row spacing. The spacing between row units may be changed by adjusting the row unit mounting assemblies 20 laterally along the tool bar 18 (e.g., along the lateral axis 13). For example, the row units may be spaced apart from one another to establish 30-inch row spacing for planting corn, and to establish 15-inch row spacing planting soy beans. Accordingly, the row unit spacing may be adjusted to achieve a particular row unit configuration for a corresponding planting application.

In certain embodiments, each row unit includes a residue manager, an opening assembly, a particulate material tube, closing discs, and a press wheel. The residue manager includes a rotating wheel having multiple tillage points or fingers that break up crop residue, thereby preparing the soil for particulate material deposition. The opening assembly includes a gauge wheel and an opener disc. The gauge wheel may be positioned a vertical distance above the opener disc to establish a target trench depth for particulate material deposition into the soil. As the row unit travels across a field, the opener disc excavates a trench into the soil for particulate material deposition. The particulate material tube, which may be positioned behind the opening assembly, directs a particulate material from a metering system into the excavated trench. The closing discs then direct the excavated soil into the trench to cover the planted particulate material. Finally, the press wheel packs the soil on top of the particulate material with a target pressure.

Figure 2:
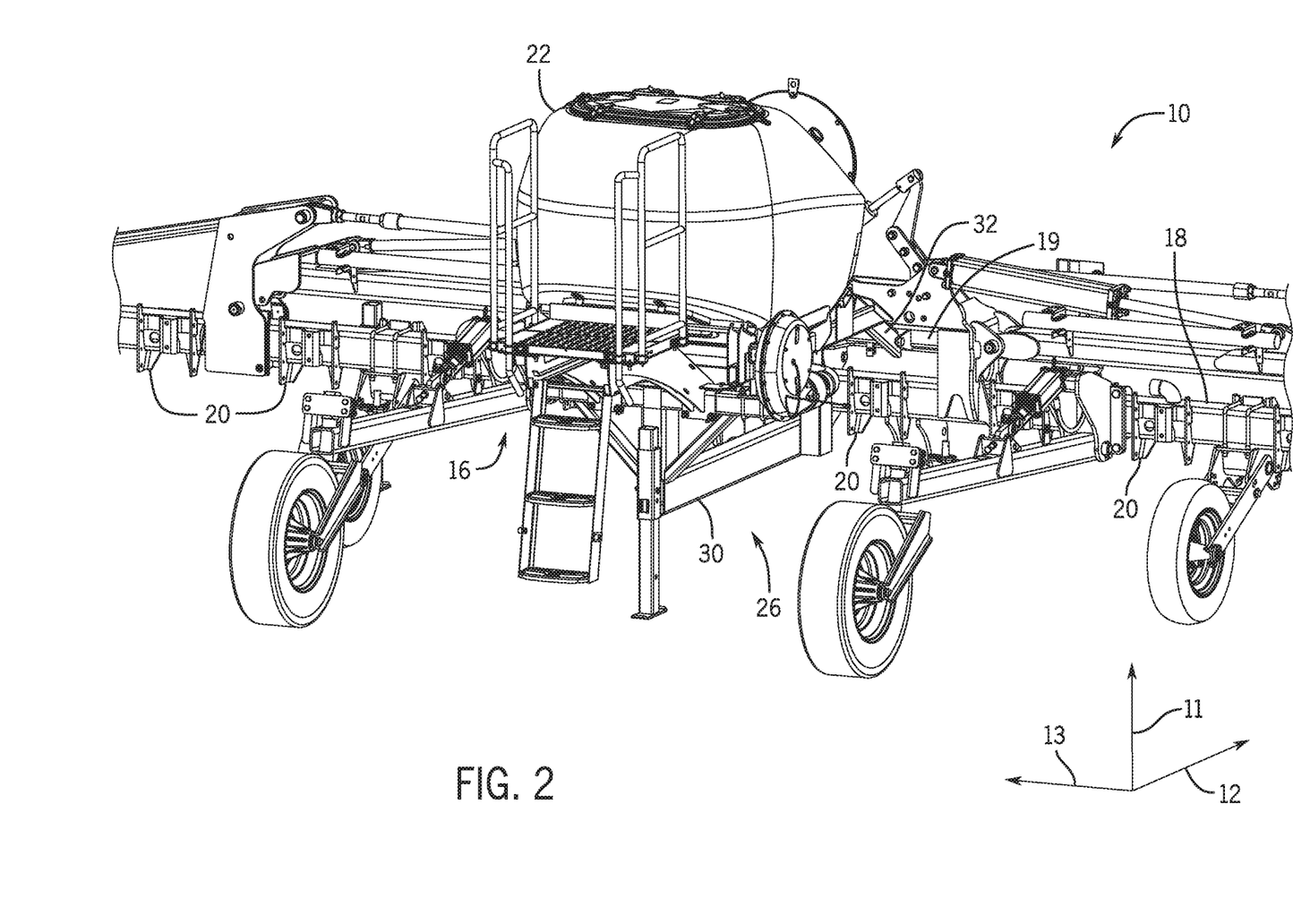

To better illustrate the tank support assembly 26, FIG. 2 is provided, which is a rear perspective view of the agricultural implement 10 of FIG. 1. As described above, the implement 10 includes the particulate material tank 22 and the tank support assembly 26. The implement 10 also includes the tool bar 18 with row unit mounting assemblies 20 disposed along the tool bar 18. In the illustrated embodiment, the row unit mounting assemblies 20 are welded to the tool bar 18, however, the row unit mounting assemblies 20 may be coupled to the tool bar 18 by other means (e.g., by fasteners). The tank support assembly 26 is configured to support the tank 22 while enabling the row unit mounting assemblies 20 near the tank support assembly 26 to be adjusted along the lateral axis 13. As illustrated, the tank support assembly 26 includes a primary connecting member 30 coupled to a tool bar 18 of the main frame assembly 16 and secondary connecting members 32 coupled to a secondary bar 19 of the main frame assembly 16. The primary connecting member 30 and the secondary connecting members 32 extend generally along the longitudinal axis and are configured to support the tank 22. However, in some embodiments, the primary connecting member 30 and the secondary connecting members 32 may extend in other ways relative to the longitudinal axis 12.

In the illustrated embodiment, the primary connecting member 30 is a single member coupled to the main frame assembly 16. The primary connecting member 30 is disposed between two row unit mounting assemblies 20 coupled to the tool bar 18 of the main frame assembly 16 (i.e., the primary connecting member 30 is disposed in lateral space between two row unit mounting assemblies 20). This position of the primary connecting member 30 enables the row unit mounting assemblies 20, and the row units coupled to the respective row unit mounting assemblies 20, to be adjusted laterally along the tool bar 18 without interference from the tank support assembly 26.

Additionally, the secondary connecting members 32 are disposed in an area generally above the primary connecting member 30. As illustrated, the tank support assembly 26 includes two secondary connecting members 32 coupled to a secondary bar 19 of the main frame assembly 16. However, the tank support assembly 26 may include more or fewer secondary connecting members 32. The secondary bar 19 extends laterally along the lateral axis 13 and is disposed generally above the tool bar 18 relative to the vertical axis 11. The secondary connecting members may also be coupled to other portions of the main frame assembly 16 generally above the tool bar 18. This position of the secondary connecting members 32 enables the row unit mounting assemblies 20, and the row units coupled to the respective row unit mounting assemblies 20, to be adjusted along the tool bar 18 without interference from the tank support assembly 26. In some embodiments, the tank support assembly 26 may also couple to secondary bar 19 of the main frame assembly 16 by other means in addition, or as an alternative, to the secondary connecting members 32 (e.g., by other members or coupling devices).

Figure 3:
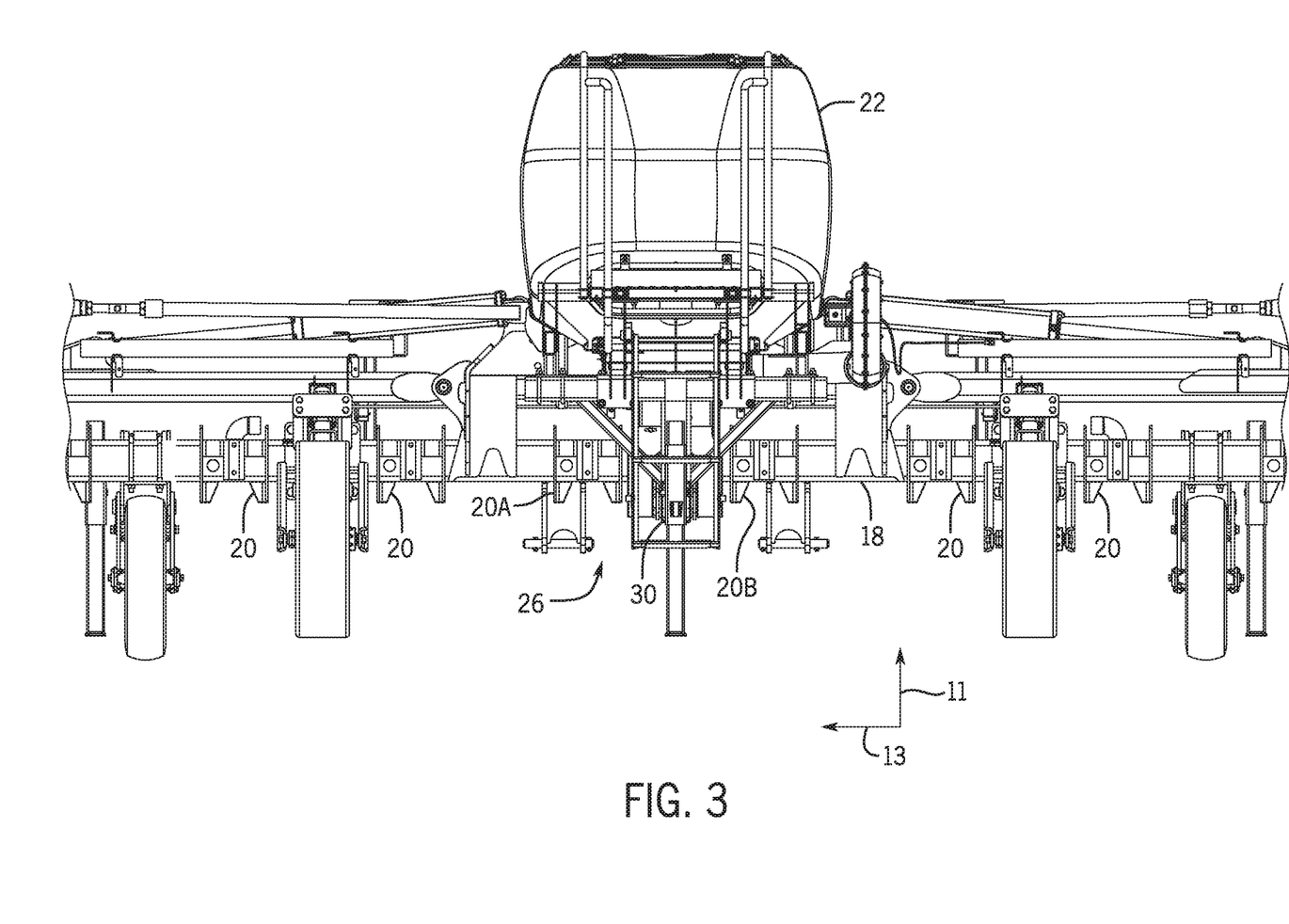
FIG. 3 is a rear planar view of the agricultural implement of FIG. 1.

FIG. 3 is a rear planar view of the agricultural implement 10 of FIG. 1. As illustrated, the primary connecting member 30 of the tank support assembly 26 is disposed between a first row unit mounting assembly 20A and a second row unit mounting assembly 20B. Row units may be coupled to the tool bar 18 via the row unit mounting assemblies 20. For example, a first row unit may be coupled to the first row unit mounting assembly 20A, and a second row unit may be coupled to the second row unit mounting assembly 20B. The lateral positions of the row unit mounting assemblies 20, and the row units coupled to the respective row unit mounting assemblies 20, are adjustable along the length of the tool bar 18 such that a target row spacing may be established.

The row unit mounting assemblies 20 near the tank support assembly 26 (e.g., the first and second row unit mounting assemblies 20A and 20B) may be adjusted to control row unit spacing near the tank support assembly 26. For example, to achieve wider row spacing, the row unit mounting assemblies 20A and 20B may be moved outwardly along the lateral axis 13 relative to the primary connecting member 30. In another example, to achieve a narrower row spacing, the row unit mounting assemblies 20A and 20B may be moved inwardly along the lateral axis 13 relative to the primary connecting member 30. In each example, other row unit mounting assemblies 20 along the tool bar 18 may also be adjusted along the lateral axis 13 in accordance with the selected row spacing. Because the primary connecting member 30 is positioned at the lateral centerpoint of the tool bar 18, and the secondary connecting members 32 are positioned generally above the tool bar 18, the row units and/or the row unit mounting assemblies 20 may be adjusted along the tool bar 18 without interference from the tank support assembly 26.

Figure 4:
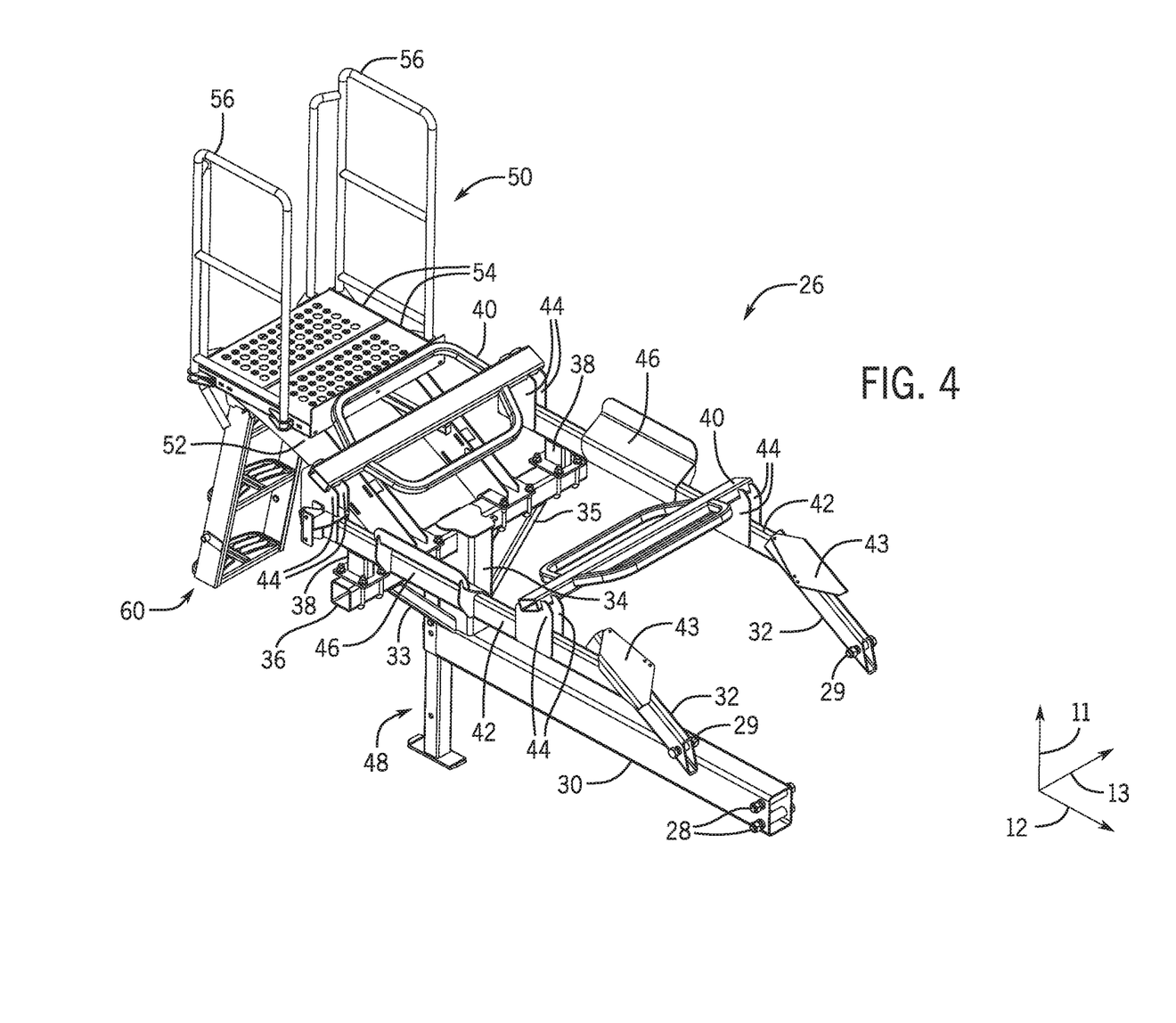
FIGS. 4 and 5 are perspective views the tank support assembly of FIG. 1.

FIG. 4 is a perspective view of the tank support assembly 26 of FIG. 1. As described above, the tank support assembly 26 includes the primary connecting member 30 and the secondary connecting members 32. The primary connecting member 30 and the secondary connecting members 32 are coupled to the main frame assembly 16 and configured to transfer the load/weight of the tank 22 to the main frame assembly 16. In the illustrated embodiment, the primary connecting member 30 includes two fasteners 28, which are configured to couple to the tool bar 18 of the main frame assembly. In some embodiments, the primary connecting member 30 may also be coupled to the tool bar 18 by more or less fasteners 28 and by other connection and/or coupling means. In addition, the secondary connecting members 32 include two fasteners 29, which are configured to couple to the secondary bar 19 of the main frame assembly 16. However, in some embodiments, the secondary connecting members 32 may be coupled to the secondary bar 19 by more or less fasteners 29 by and by other connection and/or coupling means. The fasteners 28 and the fasteners 29 may be the same type of fastener or may be different types of fasteners.

The tank support assembly 26 also includes a first support member 34, a second support member 33, and a third support member 35. The first support member 34 is coupled to the primary connecting member 30 and extends vertically upward from the primary connecting member 30 (e.g., along the vertical axis 11). As illustrated, the second support member 33 and the third support member 35 are coupled to a bottom portion of the first support member 34 near primary connecting member 30. However, the second support member 33 and the third support member 35 may also, or alternatively, couple directly to the primary connecting member 30. The second support member 33 and the third support member 35 each extend upward and outward at an angle away from the connecting member 30 (e.g., at an angle between the vertical axis 11 and the lateral axis 13). In some embodiments, however, the second support member 33 and the third support member 35 may be shaped differently while still configured to support the cross-member 36.

The first support member 34 is also coupled to a cross-member 36 at a top end of the first support member 34, opposite the bottom end of the first support member 34, which is coupled to the primary connecting member 30. The cross-member 36 extends along the lateral axis 13. The first support member 34 may be coupled to the primary connecting member 30 and/or to the cross-member 36 by a welded connection, a fastened connection, and by other coupling means. In addition, the second support member 33 and the third support member 35 are coupled to the cross-member 36 at respective top ends, opposite respective bottom ends, which are coupled to the first support member 34. The second support member 33 and the third support member 35 may be coupled to the cross-member 36, the primary connecting member 30, and/or the first support member 34 by a welded connection, a fastened connection, and by other coupling means. The first support member 34, the second support member 33, and the third support member 35 are configured to transfer a load/weight from the cross-member 36 to the primary connecting member 30. The cross-member 36 is generally positioned perpendicular to the primary connecting member 30.

In some embodiments, the first support member 34 may be omitted such that the second support member 33 and the third support member 35 are coupled to and configured to support the cross-member 36. In other embodiments, the second support member 33 and the third support member 35 may be omitted such that the first support member 34 is coupled to and configured to support the cross-member 36. In certain embodiments, the tank support assembly 26 may include other members or structural devices between the primary connecting member 30 and the cross-member 36 that are configured to support the cross-member 36 and the weight of the tank 22.

In the illustrated embodiment, the tank support assembly 26 includes side members 42. The side members 42 are coupled to the cross-member 36 via extension members 38, however, the side members 42 may be coupled to the cross-member 36 in other ways (e.g., directly). The side members 42 are also coupled to the secondary connecting members 32. In the illustrated embodiment, the tank support assembly 26 includes two side members 42 extending along the longitudinal axis 12 and positioned generally parallel to the primary connecting member 30 and the secondary connecting members 32.

The tank support assembly 26 includes support brackets 43, which are coupled to the secondary connecting members 32 and to the side members 42. Each support bracket 43 is disposed at the coupling of a respective secondary member 32 and a respective side member 42. The support brackets 43 are configured to provide support to the respective couplings. In some embodiments, the tank support assembly 26 may include additional and/or other components to support the coupling of each respective secondary member 32 and side member 42. Additionally, at least one support bracket 43 may be omitted in certain embodiments.

In addition to being coupled to the cross-member 36 and the secondary connecting members 32, the side members 42 are coupled to tank support members that are configured to couple to the tank 22 and are configured to provide direct support to the tank 22. The tank support members include main tank supports 40 and side supports 46. The main tank support 40 extend generally along the lateral axis 13, and the side support 46 extend generally along the longitudinal axis 12. The main tank supports 40 are coupled to the side members 42 via main tank support brackets 44. In the illustrated embodiment, each end of each main tank support 40 is coupled to a respective side member 42 by a respective main tank support bracket 44. The main tank support brackets 44 are configured to position the main tank supports 40 at an angle to generally match the contour of the tank 22. The main tank supports 40 are configured to couple to the tank 22, as generally depicted in FIGS. 1 and 2, and provide support for the tank 22 at forward and aft ends of the tank 22. Additionally, the side members 42 are coupled to side supports 46. In the illustrated embodiment, the side supports 46 are configured to provide lateral support to sides of the tank 22. For example, tank 22 may rest on the side supports 46. In some embodiments, the side supports 46 may be coupled to the tank 22. Alternative embodiments of the tank support assembly 26 may include other tank support configurations. For example, the tank support assembly 26 may include additional tank support members or other tank support devices.

Accordingly, various components of the tank support assembly 26 are configured to support the tank 22. In particular, the various components of the tank support assembly 26 transfer at least a portion of the weight of the tank 22 to the main frame assembly 16 via the primary connecting member 30 and the secondary connecting members 32. The primary connecting member 30 is disposed between two row units and the secondary connecting members 32 are disposed above the row units such that the primary connecting member 30 and the secondary connecting members 32 do not interfere with row unit spacing adjustments. Accordingly, various row unit spacings may be achieved in an implement 10 having the tank support assembly 26.

Figure 5:
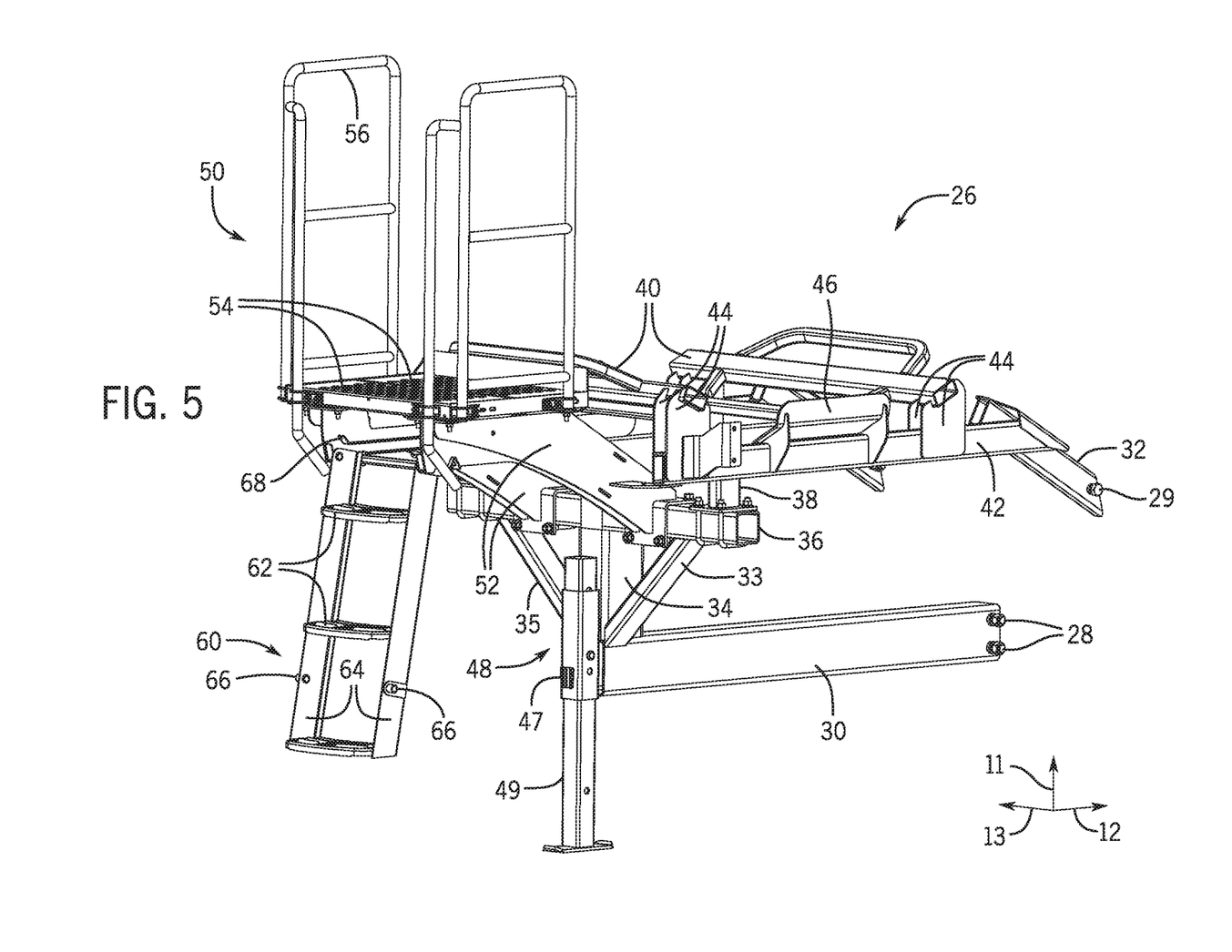

The tank support assembly 26 may also include a parking stand assembly 48, a platform assembly 50, and a ladder assembly 60. The parking stand assembly 48, which is described in greater detail below in reference to FIG. 5, is coupled to the first support member 34. In some embodiments, the parking stand assembly 48 may be coupled to the primary connecting member 30 in addition, or as an alternative, to the first support member 34. The platform assembly 50 is coupled to the cross-member 36 via platform connecting members 52, as illustrated. The platform connecting members 52 extend from the cross-member 36 to platform panels 54, and the platform connecting members 52 are coupled to both the cross-member 36 and the platform panels 54. The platforms panels 54 are configured to support the weight of one or more users of the agricultural implement 10. For example, a user may stand on the platform panels 54 to perform various tasks related to the agricultural implement 10, such as loading product into the tank 22. As illustrated, the platform panels 54 include holes for drainage and traction features to provide traction for a user to stand and walk on the platform panels 54. The platform assembly 50 also includes rails 56, which extend upwardly from the platform panels 54 along the vertical axis 11. A user may grasp the rails 56 to provide stability while standing or walking on the platform panels 54. The user may also grasp the rails 56 while climbing the ladder assembly 60. The ladder assembly 60 is coupled to the platform assembly 50, as described below in reference to FIG. 5. In some embodiments, the platform assembly, the ladder assembly, the parking stand assembly, or a combination thereof, may be omitted.

FIG. 5 is a perspective view of the tank support assembly 26 of FIG. 4. As described above, the tank support assembly 26 includes various components configured to support the tank 22 and to transfer the weight of the tank 22 to the main frame assembly 16. Additionally, the tank support assembly 26 includes the parking stand assembly 48 and the ladder assembly 60.

The parking stand assembly 48 is coupled to the first support member 34. In some embodiments, the parking stand assembly 48 may be coupled to the primary connecting member 30 in addition, or as an alternative, to the first support member 34. The parking stand assembly 48 extends along the vertical axis 11 and includes a sleeve 47 and a parking stand member 49. The parking stand member 49 is configured to adjust to various positions along the vertical axis 11 and relative to the primary connecting member 30. For example, a user of the agricultural implement 10 may lower the parking stand member 49 to a soil surface while the implement 10 is not in use. The parking stand member 49 may then lock into place via a fastener, a locking pin, or by other suitable means. In the lowered and locked position, the parking stand member 49 is configured to support and transfer at least a portion of the weight of the tank 22 to the soil. The parking stand member 49 may also be raised along the vertical axis 11 before or during planting operations by a user of the implement 10.

The ladder assembly 60 includes steps 62, side rails 64, stowage blocks 66, and stowage rails 68. The stowage rails 68 are coupled to the platform connecting members 52. In some embodiments, the stowage rails 68 and/or the ladder assembly 60 may be coupled to other components of the tank support assembly 26. In the illustrated embodiment, the ladder assembly 60 includes three steps 62 leading from a ground surface to the platform assembly 50. In some embodiments, the ladder assembly 60 may include more or fewer steps 62. The steps 62 are configured to support the weight of a user of the implement 10 and may include features to provide traction for a user walking and/or standing on the steps 62. For example, the steps may include holes, textured pads, or other features to enhance traction. The side rails 64 are coupled to the platform assembly 50 and are configured to rotate relative to the platform assembly 50. For example, the ladder assembly 60 may rotate upwardly from the illustrated position, and stowage blocks 66 may slide into the stowage rails 68 to a stowed position. The stowage blocks 66 may also slide out of the stowage rails 68, thereby enabling the ladder assembly 60 to move to a lowered position, as illustrated in FIG. 5.

Figure 6:
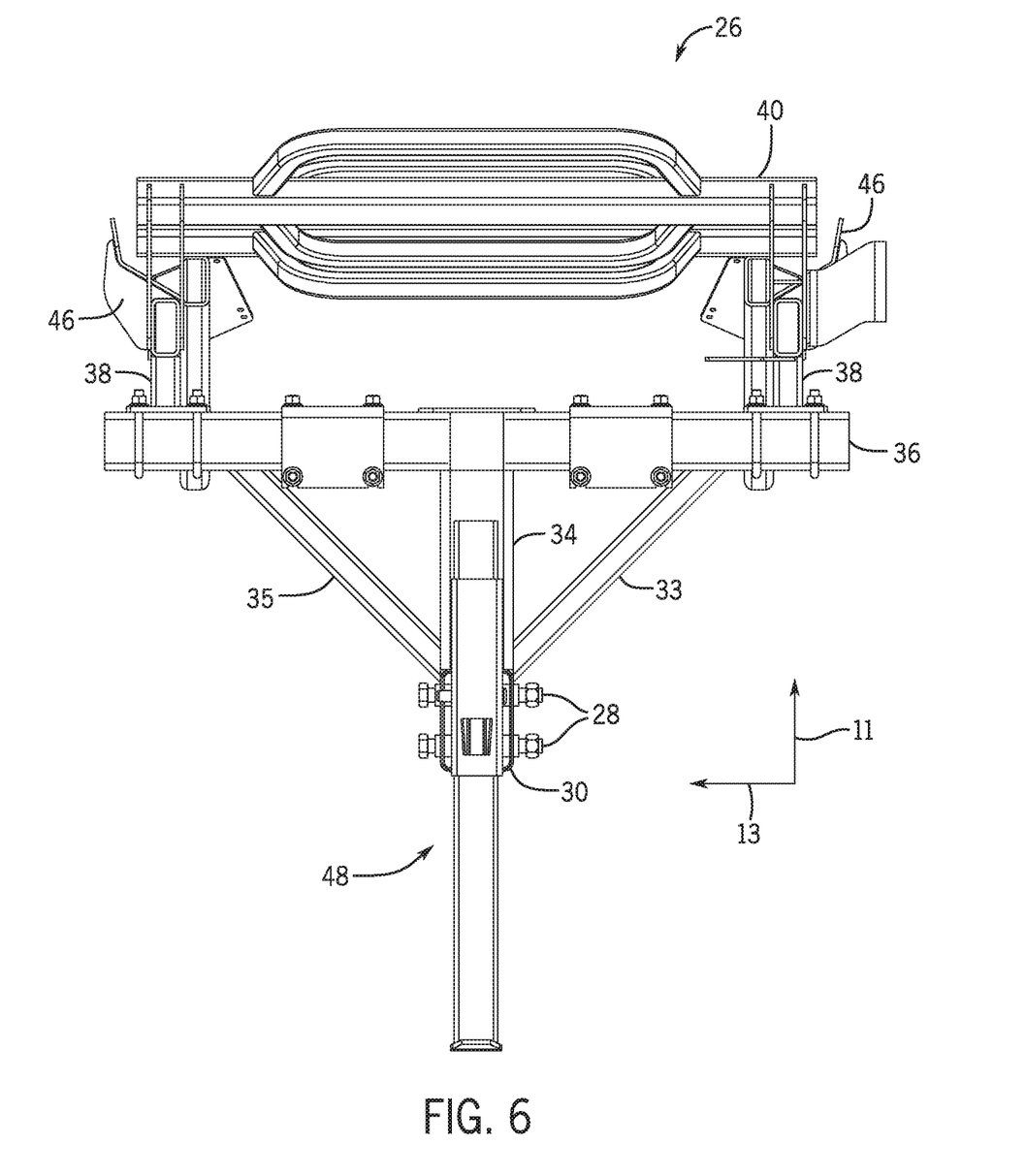
FIG. 6 is a rear planar view of the tank support assembly of FIG. 4.

FIG. 6 is a rear planar view of a tank support assembly 26 of FIG. 4. As described above, the primary connecting member 30 is coupled to the cross-member 36 via the first support member 34, the second support member 33, and the third support member 35. The extension members 38, extending along the vertical axis 11, are configured to transfer at least a portion of the weight of the tank 22 to the cross-member 36, and the first support member 34, the second support member 33, and the third support member 35 are configured to transfer the portion of the weight of the tank from the cross-member 36 to the primary connecting member 30. For example, as depicted, the first support member 34 is positioned directly above the primary connecting member 30 along the vertical axis 11 and between the primary connecting member 30 and the cross-member 36. This positioning of the first support member 34 enables the first support member 34 to transfer a portion of the weight of the tank 22 directly downward along the vertical axis 11 to the primary connecting member 30. In addition, the second support member 33 and the third support member 35 are positioned at angles and are configured to transfer a weight carried at outer portions of the cross-member 36 downwardly to the primary connecting member 30 and/or to the bottom portion of the first support member 34. This positioning of the second support member 33 and the third support member 35 further facilitates the transfer of a portion of the weight of the tank 22 to the primary connecting member 30. The second support member 33 and the third support member 35 also provide lateral stability to the cross-member 36 and the tank 22. As described above, the primary connecting member 30 is configured to be a single member disposed between two row units. Accordingly, the first support member 34, the second support member 33, and the third support member 35 are configured to transfer at least a portion of the weight of the tank 22 downwardly to the single member disposed between two row units (i.e., to the primary connecting member 30).

As described above, the positioning of the primary connecting member 30 between row units enables row unit mounting assemblies 20, and the row units coupled to the respective row unit mounting assemblies 20, to be adjusted laterally along the tool bar 18 without interference from the tank support assembly 26. This ability to adjust the row unit mounting assemblies 20 and corresponding row units enables users of the implement 10 to achieve various row unit spacings with a single implement. As such, users of the implement 10 are able to perform planting operations for a variety of crops using a single implement. Additionally, manufacturers of the implement 10 are able to more easily manufacture the implement 10 and other planting implements that include the tank support assembly 26 with varied row unit spacings.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A tank support assembly for an agricultural implement, comprising:
   a primary connecting member configured to couple to a main frame assembly of the agricultural implement, wherein the primary connecting member extends substantially along a longitudinal axis of the agricultural implement;
   a first support member configured to couple to the primary connecting member at a first end of the first support member;
   second and third support members configured to couple to the first support member, the primary connecting member, or a combination thereof, at first ends of the second and third support members, wherein the first support member extends substantially vertically upward from the primary connecting member, wherein the second and third support members extend generally upward and generally outward from the primary connecting member, and wherein the first, second, and third support members are configured to transfer a portion of a weight of a tank to the primary connecting member;
   a plurality of secondary connecting members configured to couple to the main frame assembly of the agricultural implement and to provide support for the tank;
   a cross-member coupled to the first, second, and third support members at second ends of the first, second, and third support members, wherein the first ends of the first, second, and third support members are generally opposite the second ends of the first, second, and third support members; and
   a plurality of side members each configured to couple to the cross-member and a respective secondary connecting member of the plurality of secondary connecting members.

2. The tank support assembly of claim 1, comprising a plurality of tank support members configured to provide direct support to the tank, wherein the plurality of tank support members are configured to couple to the tank and to the plurality of side members.

3. The tank support assembly of claim 1, comprising a platform assembly coupled to the cross-member, wherein the platform assembly is configured to provide a standing platform for a user of the agricultural implement and to support a weight of the user of the agricultural implement.

4. The tank support assembly of claim 3, comprising a ladder assembly coupled to the platform assembly, wherein the ladder assembly is configured to provide the user access to the platform assembly.

5. The tank support assembly of claim 1, comprising a parking stand assembly coupled to the primary connecting member, the first support member, or a combination thereof, wherein the parking stand assembly is configured to support a portion of a weight of the tank support assembly while in a lowered position.

6. An agricultural implement, comprising:
   a main frame assembly comprising a tool bar; and
   a tank support assembly, comprising:
      a primary connecting member coupled to the tool bar of the main frame assembly, wherein the primary connecting member extends generally perpendicular to the tool bar;
      a first support member configured to couple to the primary connecting member at a first end of the first support member;
      second and third support members configured to couple to the first support member, the primary connecting member, or a combination thereof, at first ends of the second and third support members, wherein the first support member extends substantially vertically upward from the primary connecting member, the second and third support members extend generally upward and generally outward from the primary connecting member, the first, second, and third support members are configured to transfer a portion of a weight of a tank to the primary connecting member, the primary connecting member is coupled to the tool bar at a first end of the primary connecting member, the first support member is coupled to the primary connecting member at a second end of the primary connecting member, the second and third support members are coupled to the second end of the primary connecting member, to the first support member, or a combination thereof, and the first end of the primary connecting member is generally opposite the second end of the primary connecting member;

a cross-member coupled to the first, second, and third support members at second ends of the first, second, and third support members, wherein the first ends of the first, second, and third support members are generally opposite the second ends of the first, second, and third support members;

a plurality of secondary connecting members configured to couple to the main frame assembly and to provide support for the tank; and a plurality of side members each configured to couple to the cross-member and a respective secondary connecting member of the plurality of secondary connecting members.

7. The agricultural implement of claim 6, comprising a plurality of tank support members configured to couple to the tank, the plurality of secondary connecting members, and the cross-member, wherein the plurality of tank support members are configured to provide direct support to the tank.

\* \* \* \* \*